United States Patent [19]

Nishiyama et al.

[11] Patent Number: 5,105,307
[45] Date of Patent: Apr. 14, 1992

[54] OPTICAL ISOLATOR

[75] Inventors: Yuko Nishiyama; Tsugio Tokumasu, both of Shizuoka, Japan

[73] Assignee: Fuji Electrochemical Co., Ltd., Tokyo, Japan

[21] Appl. No.: 431,180

[22] Filed: Nov. 3, 1989

[30] Foreign Application Priority Data

Nov. 4, 1988 [JP] Japan .................. 63-280057

[51] Int. Cl.$^5$ .................................. G02B 5/30
[52] U.S. Cl. ................... 359/484; 359/487; 359/490; 372/703
[58] Field of Search ............ 350/375, 376, 377, 384, 350/403, 370, 388, 394, 406, 407, 387, 397, 405; 372/703

[56] References Cited

U.S. PATENT DOCUMENTS

| 4,309,084 | 1/1982 | Hill | 350/377 |
| 4,756,607 | 7/1988 | Watanabe et al. | 350/376 |
| 4,770,505 | 9/1988 | Okazaki | 350/377 |

FOREIGN PATENT DOCUMENTS

| 0130934 | 7/1985 | Japan | 350/375 |
| 0218623 | 11/1985 | Japan | 350/375 |
| 0118315 | 5/1987 | Japan | 372/703 |
| 0148918 | 7/1987 | Japan | 350/375 |
| 0189422 | 8/1987 | Japan | 350/407 |
| 0049728 | 3/1988 | Japan | 350/407 |
| 0142320 | 6/1988 | Japan | 350/375 |
| 0131520 | 5/1989 | Japan | 372/703 |
| 0142526 | 6/1989 | Japan | 372/703 |
| 0185518 | 7/1989 | Japan | 372/703 |
| 0185519 | 7/1989 | Japan | 372/703 |

Primary Examiner—Bruce Y. Arnold
Assistant Examiner—R. D. Shafer
Attorney, Agent, or Firm—Fleit, Jacobson, Cohn, Price, Holman & Stern

[57] ABSTRACT

A two-stage type optical isolator comprising two isolator units connected in series, each isolator unit having a combination of a Faraday rotator, a permanent magnet and polarizers on both sides of the Faraday rotator, the two Faraday rotators and polarizers of the units having incidence/exit surfaces having directions of normals inclined relative to the direction of optical axis, and wherein an optical axis of the incident light is aligned with an optical axis of the exit light.

10 Claims, 2 Drawing Sheets

OPTICAL ISOLATOR

BACKGROUND OF THE INVENTION

The present invention relates to an optical isolator and more specifically to an optical isolator of a two-stage type for optical communications system. The present invention provides an optical isolator in which Faraday rotators and polarizers, that are the optical parts, are arranged in an inclined configuration relative to an optical axis, and optical axes of the incident light and the exit light are brought into alignment with each other in order to remove those light beams reflected from the optical parts and, hence, to obtain high degrees of isolation without causing the optical axis to be deviated.

The optical isolator is an irreversible optical device having a function that permits the transmission of a light beam in one direction but blocks the transmission of the light beam in the opposite direction. The optical isolator is used, for example, for an optical communication system that uses semiconductor laser as a source of light beam in order to prevent the laser beam from returning to the side of the source of the light beam by reflection.

The optical isolator constitutes an isolator function unit by combining the Faraday rotator and the permanent magnet, and arranging the polarizers on both sides thereof. To enhance isolation performance, such an isolator function unit may often be arranged in two stages in series in the direction of the optical axis.

As for the prior art related to the isolator of a one-stage type, there has been proposed an optical isolator in which the incidence/exit surfaces of the polarizers and the Faraday rotator have a predetermined angle with respect to the incident and exit optical axes which are on a straight line, in order to prevent the light-beam from being reflected and returned by the incidence/exit surfaces, as disclosed in Japanese Patent Publication (Unexamined) No. 62-118315, published May 29, 1987.

The optical isolator of the two-stage type exhibits very strong isolation (greater than 60 dB) compared with that of the one-stage type. With the conventional general two-stage optical isolator, however, the light beam reflected by the surfaces of optical parts such as polarizers and Faraday rotators returns to the laser side although the amount of reflection is small. Therefore, even though the light returning to the laser side can be successfully prevented by the optical isolator maintaining isolation which is as great as 60 dB or higher, it is not allowed to prevent the light beam reflected and returned by the isolator itself, or by surfaces of the optical parts, consequently offsetting the meaning and effect of high isolation.

In the optical isolator disclosed in the above-described Japanese Patent Publication No. 62-118315 in which the incidence/exit planes of optical parts have predetermined angles with respect to the incident/exit optical axis, the isolation characteristic is not always satisfactory since it is constituted in one stage.

In an anticipatory construction by employing simply two isolator portions connected in series, the total length of the optical isolator becomes unfavorably long. Furthermore, an inclined bore must be formed in the permanent magnet to mount the Faraday rotator, hindering the workability and, moreover, making it difficult to mount the Faraday rotator maintaining high precision.

SUMMARY OF THE INVENTION

An object of the present invention is to provide an improved optical isolator of the two-stage type which is free from the above-mentioned defects inherent in the prior art.

Another object of the present invention is to provide an optical isolator which exhibits an isolation characteristic that is as great as 60 dB or more.

A further object of the present invention is to provide an optical isolator which can prevent the light beam from being reflected and returned by the optical isolator itself.

A still further object of the present invention is to provide an optical isolator in which no deviation of optical axes is produced between the incident light and the exit light.

The present invention provides a two-stage type optical isolator comprising two isolator units connected in series, each isolator unit having a combination of a Faraday rotator and a permanet magnet and further having polarizers on both sides of the Faraday rotator, wherein the two Faraday rotators and the polarizers have incidence/exit surfaces having directions of normals (i.e. lines perpendicular to these surfaces) inclined relative to the direction of the optical axis, and wherein an optical axis of the incident light is aligned with an optical axis of the exit light.

In a preferred embodiment of the invention, the two polarizers positioned between the Faraday rotators are inclined in the same direction and are incorporated in the same polarizer holder.

In another embodiment of the invention, a rotator holder separate from the permanent magnet is used to mount the Faraday rotator, the permanent magnet is formed in a tubular shape such that the rotator holder is fitted therein, and an inclined mounting bore is formed in the rotator holder in order to mount the Faraday rotator in the inclined mounting bore. In this case, it is preferable that a stepped part or projection is formed in the mounting bore to position the Faraday rotator without using any particular assembling jig. Such a construciton is particularly suited when the Faraday rotator consists of a magnetic optical element obtained by forming a single crystalline magnetic garnet film on a substrate by the liquid phase epitaxial method (LPE).

According to the present invention, the two Faraday rotators and the polarizers which are the optical parts are inclined with respect to the direction of the optical axis. Therefore, the light beam reflected by the optical isolator is deviated from the axis of incident beam by a given angle and does not return to the side of the light source. Therefore, oscillation of a semiconductor laser which is the light source does not lose stability. The two Faraday rotators and the four polarizers are so combined together that the optical axis of incident light and the optical axis of exit light are placed into alignment with each other. Hence, the optical isolator as a whole does not cause the light axis to be deviated and can be easily used.

In a preferred embodiment of the present invention, in which two isolator units are combined together in series in two-stage construction to obtain high isolation while preventing the light beam from being reflected and returned by the isolator, the optical isolator of the invention exhibits very high isolation which is quite meaningful in a practical use.

If the two polarizers positioned between the Faraday rotators are inclined in the same direction and are incorporated in the same polarizer holder, the size of the optical isolator can be shortened in the lengthwise direction and the workability is enhanced since there is no need of operation to bring the axes of the two polarizers into alignment.

Furthermore, the permanent magnet is not provided with an inclined mounting bore. Instead, a permanent magnet having a cylindrical shape is used, and also a separate rotator holder having an inclined mounting bore is used. This enables the permanent magnet to be easily machined and further enables the fabrication such as positioning to be easily effected. In the case that the Faraday rotator consists of an element of the structure in which an LPE (liquid phase epitaxially grown) film of magnetic garnet is formed on the substrate, in particular, the fabrication can be carried out easily and precisely by making use of the above-mentioned Faraday rotator holder while preventing the development of cracking.

BRIEF DESCRIPTION OF THE DRAWING

The invention will now be described in detail with reference to the accompanying drawings herein.

PREFERRED EMBODIMENTS OF THE INVENTION

Figure 1:
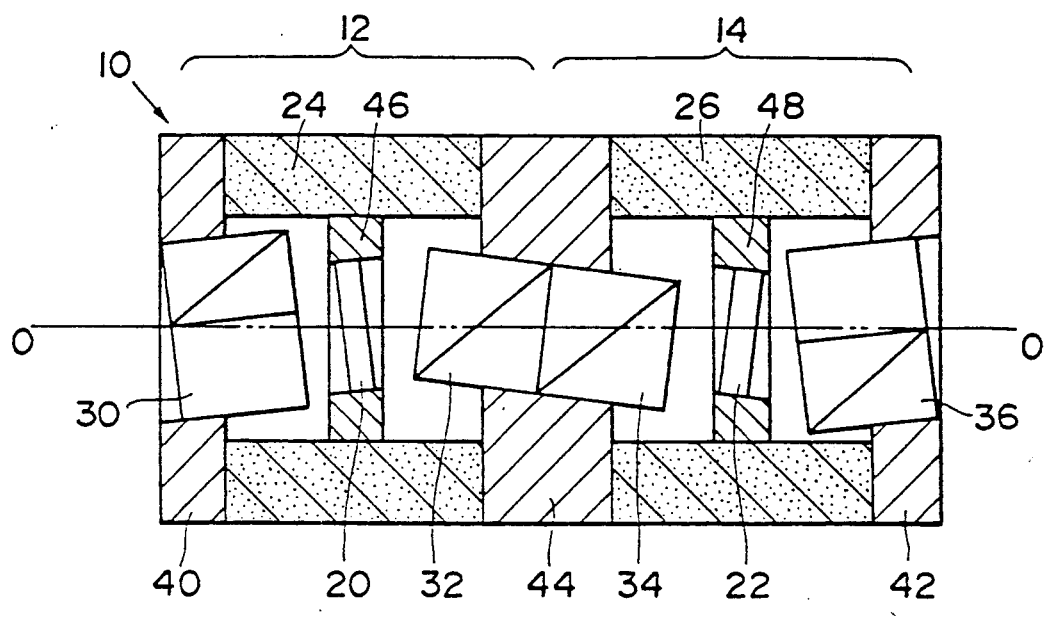
FIG. 1 is a diagram diagrammatic cross-sectional view illustrating an optical isloator according to the present invention.

Referring to FIG. 1, the optical isolator 10 in this embodiment consists of two isolator units 12 and 14 that are combined in series in the direction of optical axis 0—0. The isolator units 12, 14 have a combination of Faraday rotators 20, 22 and permanent magnets 24, 26, and further have polarizers 30, 32, 34 and 36 that are arranged on both sides of the Faraday rotators 20, 22.

The polarizers 30 and 36 located on both sides of the optical isolator are mounted on polarizer holders 40 and 42, respectively. Inclined mounting bores are formed in the polarizer holders 40 and 42, and the polarizers 30 and 36 are incorporated in the mounting bores. The two polarizers 32 and 34 located between the Faraday rotators 20, 22 are inclined in the same direction and are incorporated in the same polarizer holder 44.

The permanent magnets 24, 26 in a cylindrical shape have rotator holders 46 and 48 that just fit therein. Mounting bores that are inclined by predetermined angles are formed in the rotator holders 46 and 48, and Faraday rotators 20 and 22 are fitted therein.

The permanent magnets 24 and 26 are assembled together to form a unitary structure and are held by the polarizer holders 40, 44 and 42.

One of the features of the present invention resides in that in the isolator of the two-stage type, the polarizers 30, 32, 34, 36 and the Faraday rotators 20 and 22 are so arranged that the directions of normals, or lines perpendicular, their incidence/exite surfaces are inclined with respect to the direction of the optical axis, and the optical axis of the incident light is brought into alignment with the optical axis of the exit light.

Figure 2:
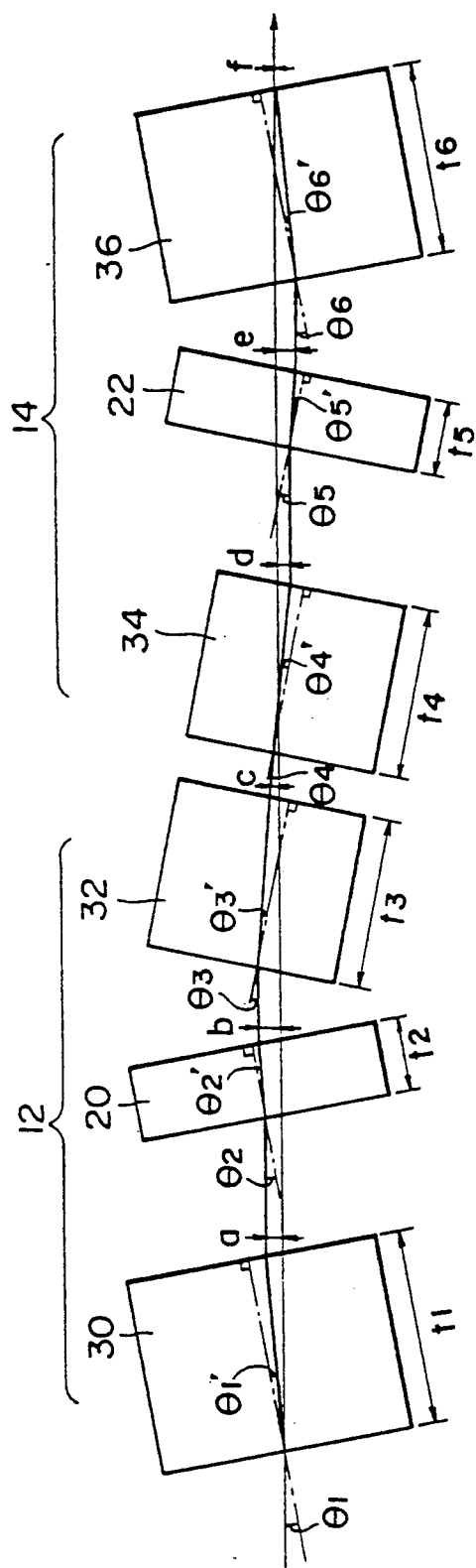
FIG. 2 is a diagram illustrating inclined conditions of the optical elements shown in FIG. 1.

More specifically, the angles are set as shown in FIG. 2. The angles subtended by the optical axis and the directions of the normals to the incidence/exit surfaces of the optical parts should desirably be about 6 degrees. If the incident angles on the incidence surfaces of the optical parts are denoted by $\theta_1, \theta_2, ---, \theta_6$, the exit angles are denoted by $\theta_1', \theta_2', ---, \theta_6'$, the thicknesses are denoted by $t_1, t_2, ---, t_6$, and the deviations from the optical axis on the exit surface are denoted by a, b, ---, f, then the deviations are given by the following equations, $$a = t_1 (\tan \theta_1 - \tan \theta_1') \cos \theta_1$$
$$b = t_2 (\tan \theta_2 - \tan \theta_2') \cos \theta_2 + a$$
$$\vdots$$
$$f = t_6 (\tan \theta_6 - \tan \theta_6') \cos \theta_6 + e$$
$$= \sum_{i=1}^{6} t_i (\tan \theta_i - \tan \theta_i') \cos \theta_6$$

Here, the angle is presumed to be positive when the parts are inclined in the counterclockwise direction as represented by the polarizer 30 in FIG. 2, and is presumed to be negative when the parts are inclined in the clockwise direction as represented by the polarizer 32. From the above equations, the optical axis of the incident light can be brought into alignment with the optical axis of the exit light if the inclination angles of the optical parts are so set that f=0.

Inclination directions of the optical parts can be changed in various ways. In FIG. 1, for instance, the isolator unit 12 of the left side in the drawing and the isolator unit 14 of the right side can be arranged symmetrically to each other on a surface. In this case, the polarizer 32 and the polarizer 34 are inclined in the opposite directions relative to each other. However, if the two polarizers 32 and 34 located between the Faraday rotators 20, 22 are inclined in the same direction and are incorporated in the same polarizer holder 44 as shown in FIG. 1, the length of the optical isolator can be shortened in the axial direction and, furthermore, no operation is needed to bring the axes of the two polarizers 32 and 34 into alignment with each other.

Figure 3:
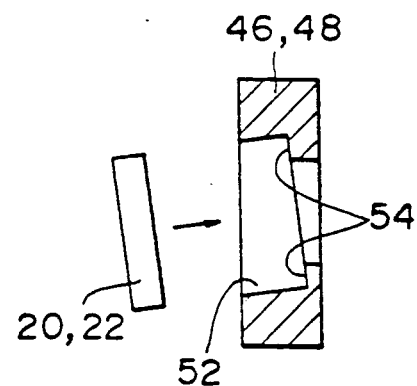
FIG. 3 is a cross-sectional view of a Faraday rotator holder used in the present invention, showing the Faraday rotator to be incorporated therein.

Rotator holders 46 and 48 are used to mount the Faraday rotators as shown in FIG. 1. By using such rotator holders, the permanent magnets 24 and 26 may be formed in a simple cylindrical shape; i.e., there is no need of forming inclined bores and, consequently, this facilitates the machining and contributes to decreasing the manufacturing cost. As shown in FIG. 3, the rotator holders 46 and 48 have an inclined mounting bore 52 with a stepped portion or shoulder 54 for positioning therein the Faraday rotators 20 and 22. With this configuration, the Faraday rotators 20 and 22 are secured at the centers thereof requiring no jig for determining the position or inclinations, and workability is remarkably improved. In particular, when the Faraday rotator has a small thickness like the one obtained by growing a magnetic garnet film on the substrate by the liquid phase epitaxial (LPE) method, difficulty is involved to mount it when the bulk YIG is employed since the Faraday rotator cracks easily. Using the rotator holders 46, 48 as shown in FIG. 3, however, the angles of inclination can be maintained precisely while effecting the center positioning. Moreover, there is no likelihood that the Faraday rotators are cracked, and the fabrication operation can be carried out efficiently.

According to the present invention as described above, the directions of normals on the incidence/exit surfaces of the optical parts are inclined with respect to the direction of the optical axis. Therefore, the light beam reflected by the optical isolator is prevented from returning toward the source of light; i.e., there is realized a two-stage type optical isolator of high performance which exhibits isolation characteristics of as high as 60 dB or more.

According to the present invention, the optical axis of the incident light is brought into alignment with the optical axis of the exit light, and there is no likelihood of deviation in the optical axis. Therefore, the optical isolator can be easily incorporated in the system.

Furthermore, since the two polarizers 32, 34 positioned between the Faraday rotators are inclined in the same direction and are incorporated in the same polarizer holder 44, the overall length of the optical isolator can be shortened in addition to decreasing the number of portions where the axes must be brought into alignment with each other, contributing to improving workability.

Moreover, the permanent magnet is formed in a cylindrical shape and the holder is fitted therein for positioning and securing the Faraday rotator. Therefore, the permanent magnet can be machined easily and the Faraday rotator can be easily mounted, facilitating the fabrication operation.

We claim:

1. An optical isolator having an optical axis extending therethrough comprising:
   two isolator units connected together in series; each isolator unit comprising,
      a cylindrically shaped permanent magnet,
      a Faraday rotator holder mounted in said permanent magnet and having an inclined bore,
      a Faraday rotator mounted in said inclined bore of said Faraday rotator holder,
      a polarizer holder on one side of said Faraday rotator having an inclined bore for receiving a single polarizer therein, and
      a polarizer mounted in said inclined bore of said polarizer holder;
   a single connector polarizer holder positioned between said two isolator units and including an inclined bore for receiving a pair of polarizers therein and connecting said two isolator units together in series such that the holders for single polarizers are positioned at distal ends of the optical isolator;
   a pair of polarizers mounted in said inclined bore of said connector polarizer holder both being inclined in the same direction; incidence and exit surfaces on said Faraday rotators and said polarizers of said optical isolator having directions of lines perpendicular thereto inclined at angles of inclination relative to the direction of the optical axis so that incident light passing through said isolator and exit light emitted therefrom have optical axes aligned with each other, the directions of inclinations of said bores determining said angles of inclination.

2. An optical isolator as claimed in claim 1 wherein:
   said Faraday rotator comprises a single crystalline magnetic garnet film formed on a substrate by a liquid phase epitaxial technique.

3. An optical isolator as claimed in claim 1 and further comprising:
   a shoulder means in said inclined bore of each Faraday rotator holder engageable with said Faraday rotator mounted therein for accurately positioning said Faraday rotator in said inclined bore.

4. An optical isolator as claimed in claim 3 wherein:
   said Faraday rotator comprises a single crystalline magnetic garnet film formed on a substrate by a liquid phase epitaxial technique.

5. An optical isolator as claimed in claim 3 wherein:
   said inclined bores of said Faraday rotator holders of said two isolator units are inclined in opposite directions relative to the optical axis.

6. An optical isolator as claimed in claim 3 wherein:
   said inclined bores of said polarizer holders of said two isolator units which are not disposed between said Faraday rotators are inclined in the same direction relative to said optical axis.

7. An optical isolator as claimed in claim 1 wherein:
   said inclined bores of said Faraday rotator holders of said two isolator units are inclined in opposite directions relative to the optical axis.

8. An optical isolator as claimed in claim 7 wherein:
   said inclined bores of said polarizer holders of said two isolator units which are not disposed between said Faraday rotators are inclined in the same direction relative to said optical axis.

9. An optical isolator as claimed in claim 1 wherein:
   said inclined bores of said polarizer holders of said two isolator units which are not disposed between said Faraday rotators are inclined in the same direction relative to said optical axis.

10. An optical isolator as claimed in claim 9 wherein:
   said inclined bores of said polarizer holders which are not disposed between said Faraday rotators and said polarizers mounted therein are inclined in a direction opposite to the direction of inclination of said polarizers disposed between said Faraday rotators.

* * * * *